United States Patent
Rinkes

(10) Patent No.: US 8,120,486 B2
(45) Date of Patent: Feb. 21, 2012

(54) METHODS AND SYSTEMS FOR TRACKING RFID DEVICES

(75) Inventor: Charles Rinkes, Medina, OH (US)

(73) Assignee: Symbol Technologies, Inc., Holtsville, NY (US)

( * ) Notice: Subject to any disclaimer, the term of this patent is extended or adjusted under 35 U.S.C. 154(b) by 259 days.

(21) Appl. No.: 12/136,578

(22) Filed: Jun. 10, 2008

(65) Prior Publication Data

US 2009/0303047 A1    Dec. 10, 2009

(51) Int. Cl.
*G08B 13/14* (2006.01)

(52) U.S. Cl. .................... 340/572.1; 340/10.1

(58) Field of Classification Search ......... 340/572.1, 340/572.4, 5.1, 10.1; 235/375
See application file for complete search history.

(56) References Cited

U.S. PATENT DOCUMENTS

| | | | | |
|---|---|---|---|---|
| 6,348,856 B1 * | 2/2002 | Jones et al. | | 340/10.1 |
| 6,563,423 B2 * | 5/2003 | Smith | | 340/572.1 |
| 7,319,397 B2 * | 1/2008 | Chung et al. | | 340/572.4 |
| 7,504,928 B2 * | 3/2009 | Nierenberg et al. | | 340/572.1 |
| 7,525,434 B2 * | 4/2009 | Batra | | 340/572.1 |
| 7,675,412 B2 * | 3/2010 | Adra | | 340/10.1 |
| 2003/0174099 A1 * | 9/2003 | Bauer et al. | | 340/572.1 |
| 2006/0055552 A1 | 3/2006 | Chung | | |
| 2006/0082457 A1 | 4/2006 | Artem | | |
| 2008/0111661 A1 | 5/2008 | Lin | | |
| 2009/0058611 A1 * | 3/2009 | Kawamura et al. | | 340/10.1 |
| 2009/0058650 A1 * | 3/2009 | Fellenstein et al. | | 340/572.1 |
| 2009/0271251 A1 * | 10/2009 | Sorensen et al. | | 340/572.1 |

OTHER PUBLICATIONS

PCT Search Report Dated Jul. 29, 2009.

* cited by examiner

*Primary Examiner* — John A Tweel, Jr.
(74) *Attorney, Agent, or Firm* — Glenn Frankenburger; Bartholomew DiVita; Terri Hughes Smith

(57) ABSTRACT

Methods, systems, and apparatuses for tracking and monitoring tagged objects in an RFID environment is described. By varying RFID reader antenna output power levels and detecting RFID devices in the vicinity, data about position and orientation of the RFID devices can be gathered. This gathered data is used to correlate with pre-stored data about RFID devices' position and orientation. Such a correlation then can be used to infer data about neighboring RFID devices based upon data stored in the database. Such an inferential technique also results in a faster analysis of position and orientation data of RFID devices, and also leads to faster tracking of RFID enabled devices. Unnecessary reads and high power operations of the RFID reader are also avoided.

17 Claims, 12 Drawing Sheets

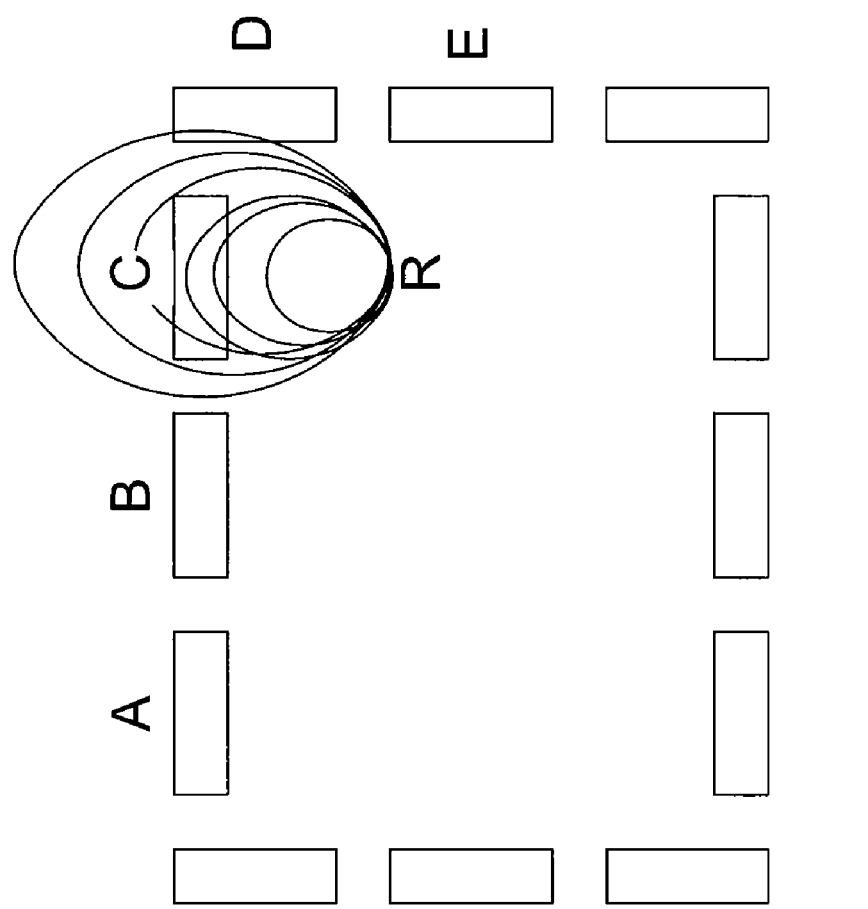

25% Antenna Power

METHODS AND SYSTEMS FOR TRACKING RFID DEVICES

BACKGROUND OF THE INVENTION

1. Field of the Invention

The invention relates to radio frequency identification (RFID) reader technology, and in particular, to a system and method to track RFID devices.

2. Background

The monitoring of workforce and inventory movement is a major concern for businesses today. A slight modification in the path taken by an employee when taking inventory may increase efficiency and result in significant savings for a company. To achieve a complete knowledge of when and where an RFID tagged object or employee is located, conventional RFID readers utilize a brute-force technique of continuous reading of tags at constant power to gather position/orientation of RFID tags. The type and extent of data that can be obtained by these brute force techniques is limited. Additionally, these conventional real time tracking solutions generally require additional hardware installed at various workplace locations.

Thus, what is needed are intelligent techniques and systems to track RFID enabled devices using minimal hardware to determine position and/or location and orientation of RFID tagged objects.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 4A-4H illustrate scenarios where power levels of an RFID reader are varied based upon inferred data relating to one or more tags' orientation.

Figure 1:
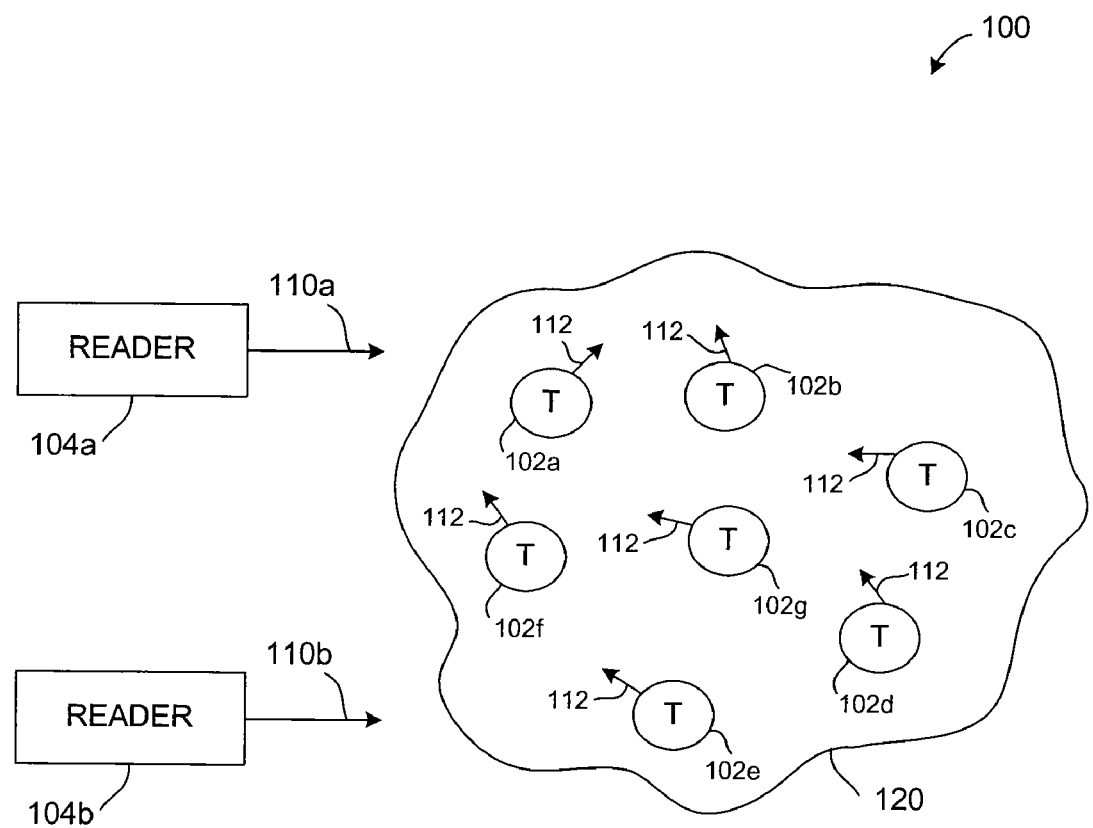
FIG. 1 illustrates an exemplary environment in which RFID readers communicate with an exemplary population of RFID tags.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

1.0 Introduction

Methods, systems, and apparatuses for RFID devices are described herein. In particular, methods, systems, apparatuses, and computer program products for tracking RFID enabled devices, such as mobile employees carrying RFID readers, or RFID enabled inventory items, are described.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

2.0 Example RFID Environment

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102. Environment 100 includes any number of one or more readers 104. For example, environment 100 includes a first reader 104a and a second reader 104b (also interchangeably referred to herein as a single RFID reader 104). Readers 104a and/or 104b may be requested by an external application to address the population of tags 120. Alternatively, reader 104a and/or reader 104b may have internal logic that initiates communication, or may have a trigger mechanism (for example, an ON/OFF trigger) that an operator or a central controller of RFID reader 104 uses to initiate communication. Readers 104a and 104b may also communicate with each other in a reader network.

As shown in FIG. 1, reader 104a transmits an interrogation signal 110a having a carrier frequency to the population of tags 120. Reader 104b transmits an interrogation signal 110b having a carrier frequency to the population of tags 120. Each such transmission of an interrogation signal by the RFID readers 104a and b consumes power. By practice of this invention, power consumption of RFID readers 104 a and b is reduced. In addition, the ability to vary power levels of RFID readers 104a and b aids in avoiding tag misses and/or redundant tag reads.

Readers 104a and 104b typically operate in one or more of the frequency bands allotted for this type of RF communication. For example, frequency bands of 902-928 MHz and 2400-2483.5 MHz have been defined for certain RFID applications by the Federal Communication Commission (FCC).

3.0 Example Embodiments

According to an exemplary embodiment of the invention, RFID antenna output power level is set at a predetermined value. The output power level is then raised or lowered and data related to tags that enter or leave the antenna's field of view, and the order in which such tags move in or move out is recorded. By comparing which tags entered or left the antenna's field at various output levels, location and/or orientation of these tags can be inferred.

Location and orientation information for a reader and/or tagged object can be obtained by systematically altering the output power level of reader 104 and performing a read of tags in the field of view of the reader. During such an operation, RFID reader 104 varies its output power, to detect one or more RFID tags in a vicinity or field of view of RFID reader 104. Depending on various reflections from different tags and noting which tags enter or leave RFID reader 104 antenna field of view, and in what order, RFID reader 104 can then infer spatial orientation of tags and/or the location and orientation of the reader 104. Such a determination location and orientation is performed by comparing data gathered from multiple reads of a tag population (at varying power levels). Once orientation is determined for one or more tags, RFID reader 104's power level can be set back to a predetermined value for start of the next interrogation cycle can bring down its power levels before a next set of tag scans is performed, thereby saving battery and increasing time to recharge.

These exemplary embodiments are described in detail below. It should be noted that one skilled in the art, after reading this disclosure, can contemplate other such techniques and systems where RFID reader 104 can be operated at varying power levels infer position and orientation data of tags by correlating data gathered during RFID reader reads with data existing in a database of known tag locations. Additionally or alternatively, though a single RFID reader 104 is described, one skilled in the art, after reading this disclosure, can easily extend the ideas embodied in this invention to multiple RFID readers, such as an array of RFID readers, for example.

3.1 Orientation/Location Determination

Real time tracking provides valuable information to end users on customer habits and movement of the workforce. Current real time location monitoring solutions require additional hardware. In embodiments of the present invention, the output power level of the reader can be modified across reads of the tag population. The tag data gathered (e.g., which tags enter or leave the antenna field at various output levels) can be stored and correlated to determine location and orientation information for the reader.

Figure 2:
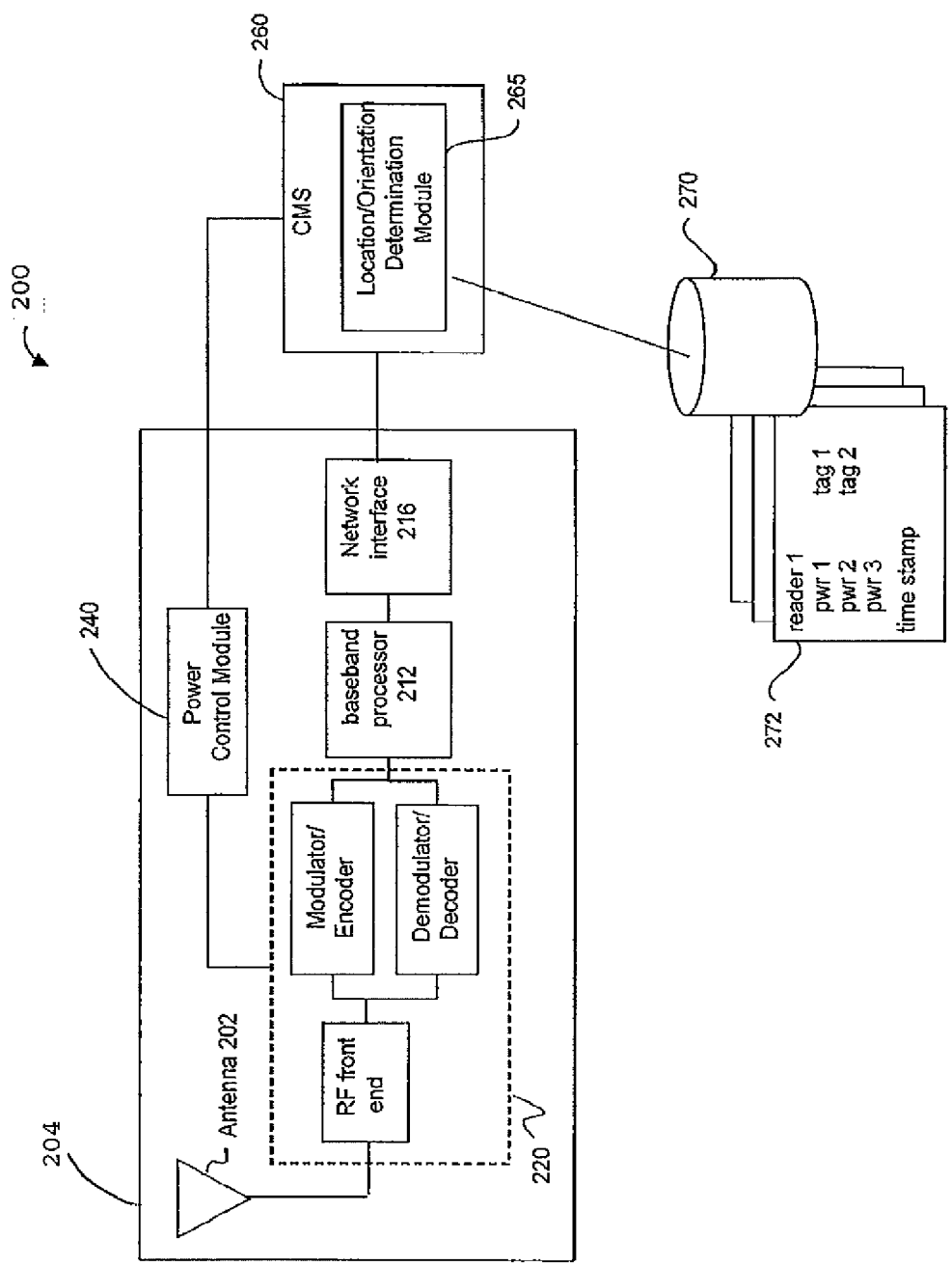
FIG. 2 illustrates an exemplary system to determine location and/or orientation of RFID tagged objects/items by using power variation in an RFID reader and associated reader circuitry.

FIG. 2 depicts an exemplary system 200 for determining location and/or orientation of a device using RFID tag data, according to embodiments of the present invention. System 200 includes an RFID reader 204 and a centralized management system (CMS) 260.

Reader 204 includes one or more antennas 202, a receiver and transmitter portion 220 (also referred to as transceiver 220), a baseband processor 212, a network interface 216, and a power control module 240. These components of reader 204 may include software, hardware, and/or firmware, or any combination thereof, for performing their functions. Antennas 202, transceiver 220, baseband processor 212, and network interface 216 are well known to those skilled in the art.

Power control module 240 is configured to modify the output power level of reader 204. In an embodiment, power control module 240 modifies the power level based on signals received from CMS 260. In addition or alternatively, power control module 240 may also include an algorithm to systematically modify the output level of the reader over a series of read cycles for the reader.

Although a single RFID reader 204 is depicted in FIG. 2, one skilled in the art can easily contemplate that system 200 may include multiple RFID readers. CMS 260 is configured to receive tag data from one or more readers 204. In an embodiment, CMS 260 includes location/orientation determination module 265. Location/orientation determination module 265 is configured to receive data from reader 204 for a read of a tag population and associate the data with reader power level used to obtain the received tag data. The power level/tag data is stored in a record in database 270. Location/orientation module 265 is further configured to cause reader 204 to vary the output power level and perform a subsequent read of the tag population. Location/orientation module 265 is also configured to correlate the data obtained across multiple reads to derive location and orientation for reader 204 and/or objects in the tag population.

Database 270 stores a set of records for one or more readers. Exemplary record 272 includes an identification of the reader, one or more read entries, and a timestamp for the record. A read entry includes the power level used for the read and associated tag data obtained during the read. Each reader may have multiple records. Database may also include details related to the antenna configuration of the reader. Database can be any form of data store. For example, database 270 can be an SQL database provided by IBM Corporation of Armonk, N.Y.

In an embodiment, location/orientation module 265 can correlate data from multiple records for a reader (or multiple readers) to generate a report of reader movement or object movement within a predetermined period of time.

Figure 3:
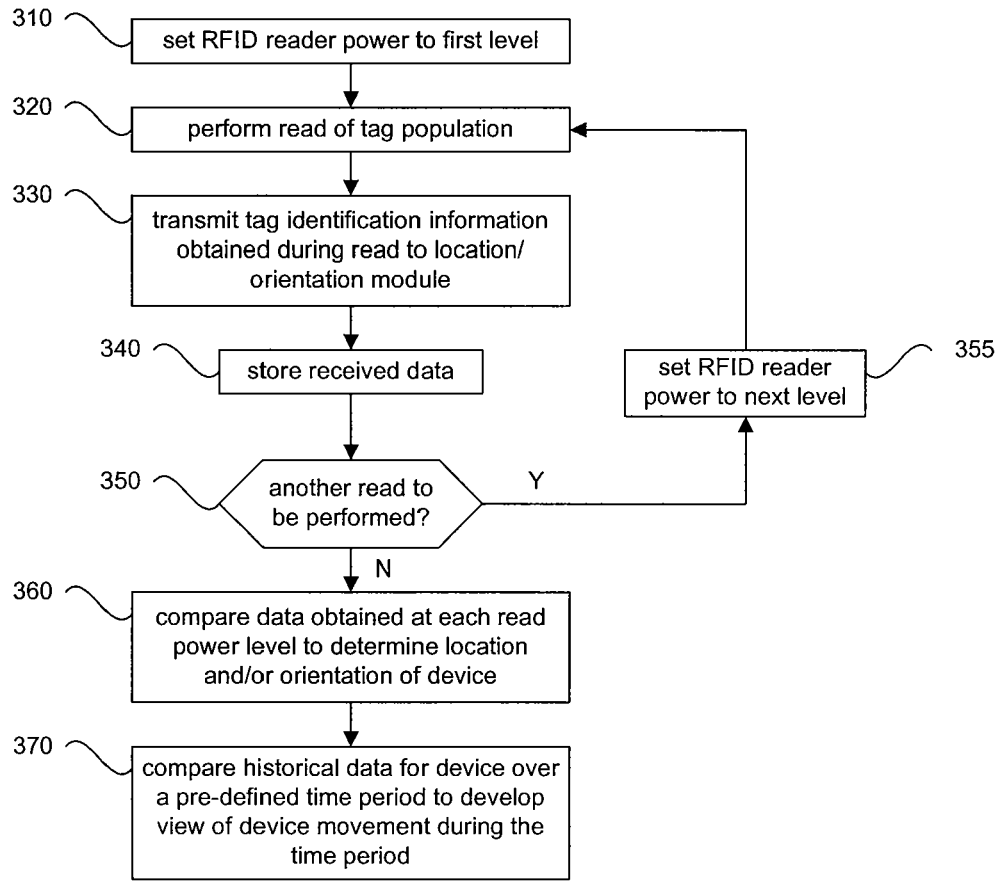
FIG. 3 illustrates a flowchart for determining location and orientation using tag identification data.

FIG. 3 depicts a flowchart 300 of an exemplary method for determining location and orientation using tag identification data, according to embodiments of the present invention. Flowchart 300 is described with continued reference to the embodiment of FIG. 2. However, flowchart 300 is not limited to those embodiments. Note that the steps depicted in FIG. 3 do not necessarily have to occur in the order shown.

In step 310, the output power level of the RFID reader is set to a first level. In an embodiment, the reader power level may be set to a minimum level then subsequently increased. Alternatively, the reader power level may be set to a maximum level then subsequently decreased. In a further alternative, the reader power level may be set to a value in the midpoint and then increased or decreased according to a predetermined method.

In step 320, reader 204 performs a read of the tag population at the established output level.

In step 330, reader 204 transmits the tag identification data obtained during the read performed in step 320 to CMS 260.

In step 340, the tag data is associated with the output level used by the reader 104 to obtain the tag data and stored in a database accessible by the location/orientation determination module.

In step 350, a determination is made whether additional reads of the tag population are to be performed. If additional reads are required, operation proceeds to step 355. If no additional reads are required, operation proceeds to step 360.

In step 355, the output power level of the reader is set to a different level. In an embodiment, location/orientation module 265 sends a signal causing power control module to alter the output power of reader 204. Alternatively, power control module 260 alters the output level in accordance with a predetermined technique.

In step 360, location/orientation determination module 265 compares the tag data obtained at each read power level for the reader to determine location and/or orientation of the reader device at a specific time or period of time. Location/orientation determination module 265 may also take into consideration the type of antenna and the resulting antenna pattern of reader 204 when making the determination.

In step 370, location/orientation determination module 265 compares historical data for a reader 204 over a time period (e.g., a work shift) to develop a report of device movement during that period.

FIGS. 4A-4H illustrate the above method in more detail.

Consider a scenario with 7 tags, A-G, and RFID reader 104 shown as "R" in FIGS. 4A-4H. Also in FIGS. 4A-4H, outwardly radiating ovals represent antenna output power levels. For example, larger ovals represent a higher antenna output level and smaller ovals represent lower output power levels.

Figure 4A:
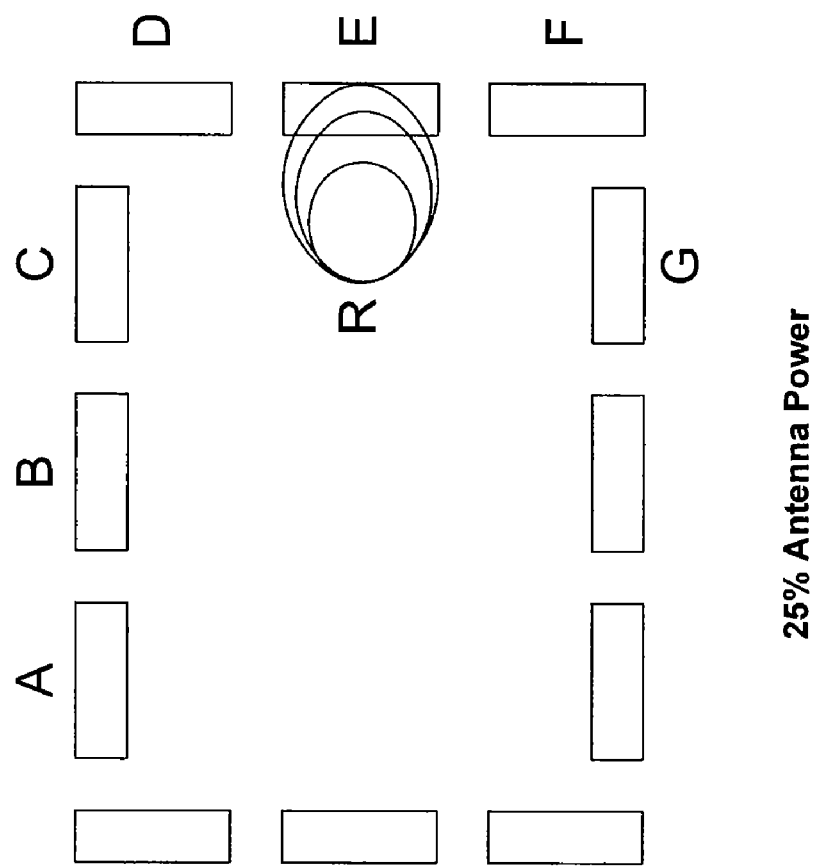
Figure 4B:
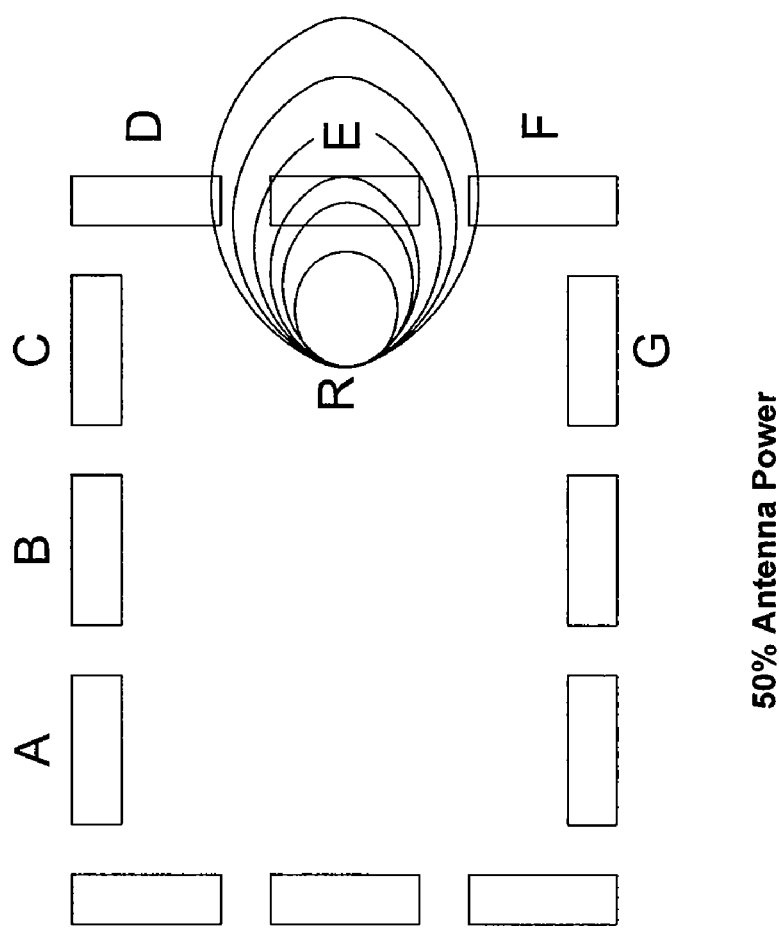

As shown in FIG. 4A, RFID reader 204 antenna output power is set to 25% of its maximum output level. In this scenario, RFID reader 204 sees tag E first. In FIG. 4B, antenna output power is increased to 50% and tags D and F enter RFID reader 204 field of view. Based on this data, RFID reader 104 knows that tag E lies between tags D and F and knowing that tag E was detected first, RFID reader 104 estimates that a tagged object is at tag E's location, and is pointing towards tag E.

Figure 4C:
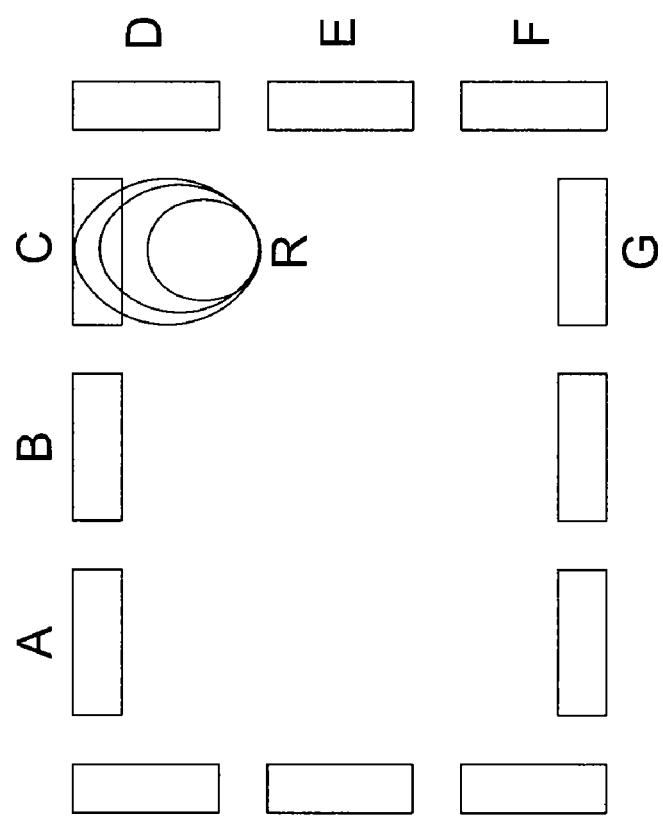
Figure 4E:
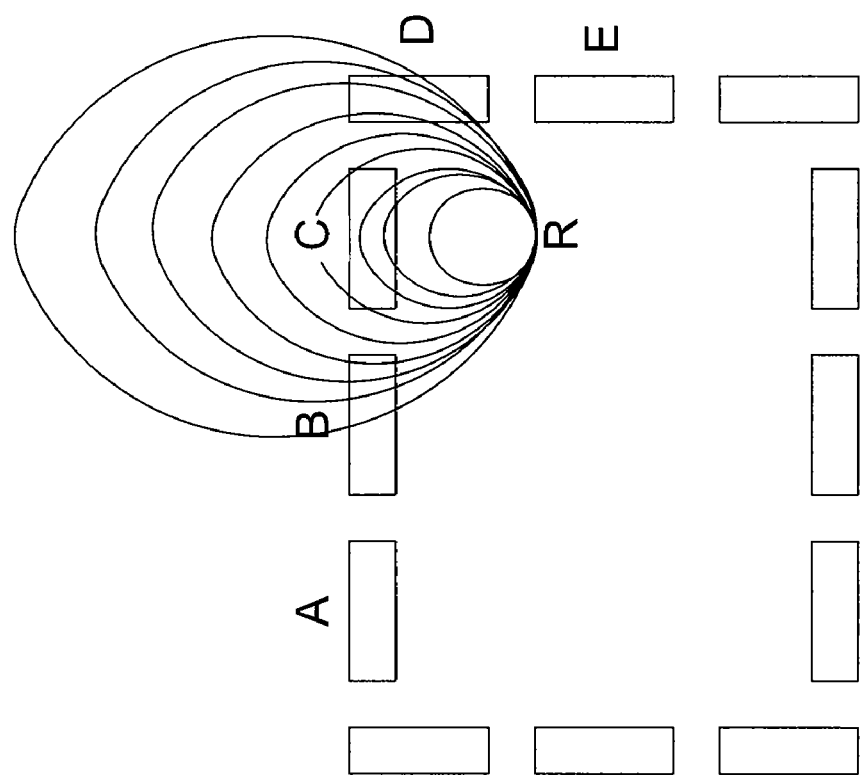

FIG. 4C shows RFID reader 204 turned in a different direction as compared to FIGS. 4A and 4B. In FIG. 4C the antenna power is set to 25% again, and RFID reader 204 sees tags C. Then, as shown in FIG. 4D, RFID reader 204 increases its antenna output power level to 50% and tag D also enters RFID reader 104's field. At this point, it can not be determined if RFID reader 104 is facing tag C or tag D. In FIG. 4E, RFID reader 204 power is increased to 100% of its output level and at this point tag B becomes visible to the antenna. Therefore, using information gathered in FIG. 4C and 4D and by having another tag enter RFID reader 204's field of view as in FIG. 4E, it can now be determined that RFID reader 204 is indeed facing tag C. If RFID reader 104 were facing tag D instead of tag C, then tag E could have become visible to RFID reader 104 when output power was increased to 100% in FIG. 4E.

Figure 4F:
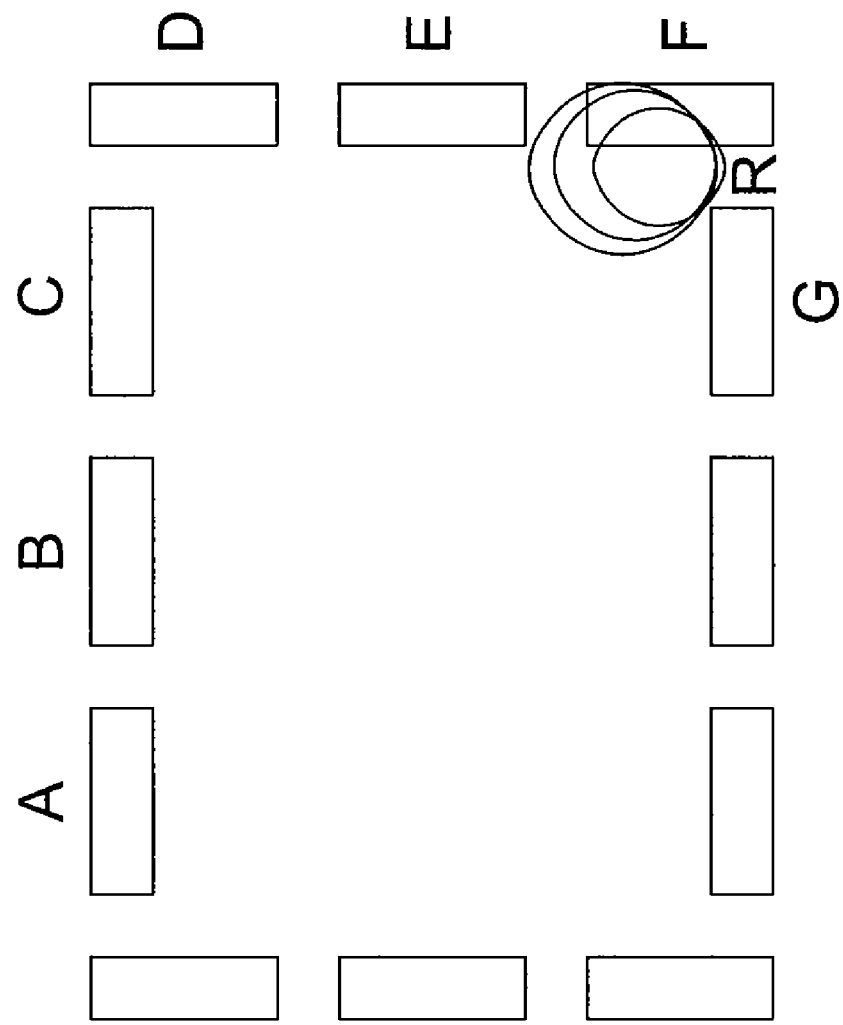
Figure 4G:
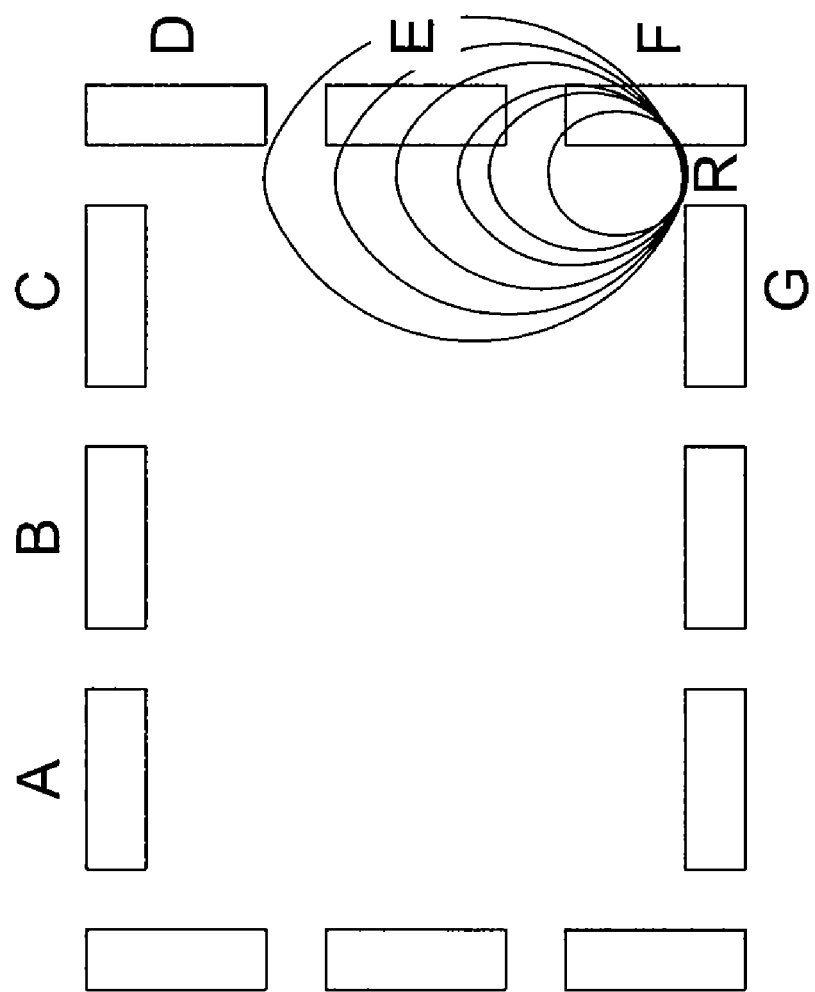
Figure 4H:
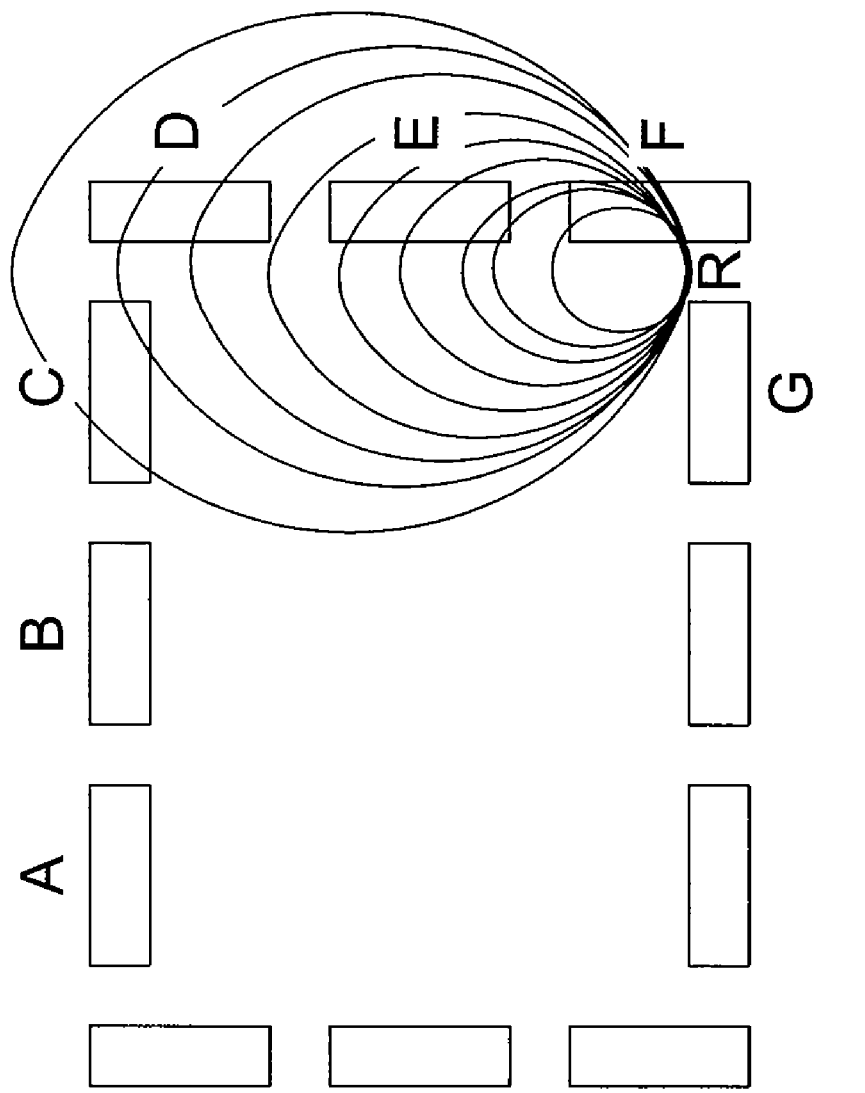

In yet another scenario shown in FIGS. 4F to 4H, RFID reader 204 is close to tag F. As shown in FIG. 4F, when RFID reader antenna power is set to 25%, the device sees only tag F. Then, as shown in FIG. 4G, RFID reader 204 antenna power is increased to 50% and tag E enters RFID reader 204's field of view. Once again, at this point it can not be determined if RFID reader 204 is facing tag F or tag C. To determine this, as shown in FIG. 4H, RFID reader 204 increases the antenna output power to 100% to check which tags now enter the field. As shown in FIG. 4H, when the RFID reader 104 antenna power is 100%, tag D and tag C become visible and it can subsequently be determined that the device is facing tag C. If it were facing tag F, then tags D and C would not have become visible when power was increased to 100%. Those knowledgeable in the RFID reader antenna radiation patterns would quickly recognize that antennas for different radiation patterns or RFID tags arranged in different patterns could use similar power management techniques to determine tag orientation by comparing tags entering or leaving the field with a known database of tag orientation.

4.0 Computer Embodiments

Figure 5:
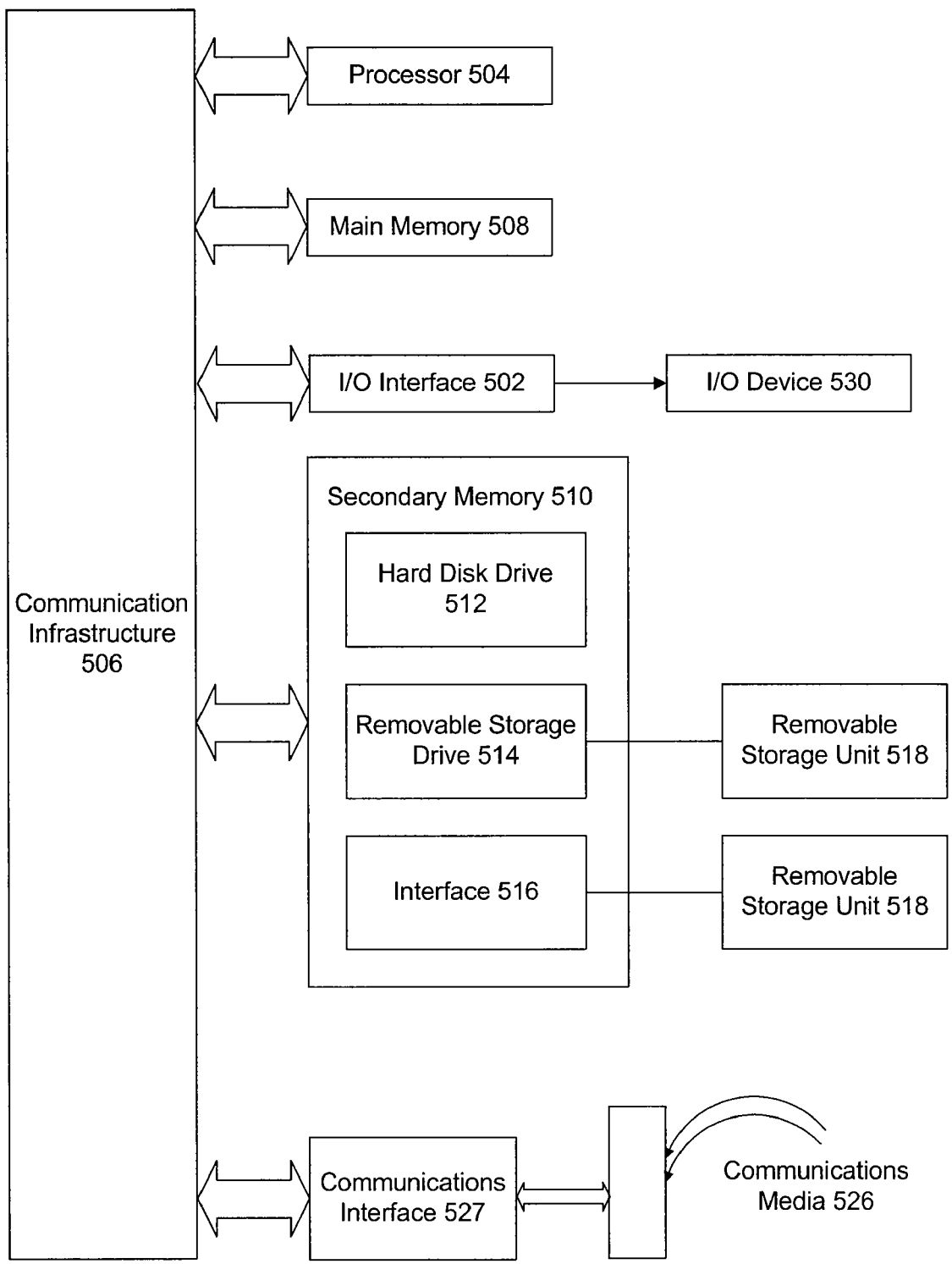
FIG. 5 illustrates an exemplary computer system used to control power management of an RFID reader.

In an embodiment of the present invention, the system and components of the present invention described herein are implemented using well known computer systems, such as a computer system 500 shown in FIG. 5. Computer system 500 can be any commercially available and well known computer capable of performing the functions described herein, such as computers available from International Business Machines, Apple, Silicon Graphics Inc., Sun, HP, Dell, Compaq, Digital, Cray, etc. Alternatively, computer system 500 can be a custom built system.

Computer system 500 includes one or more processors (also called central processing units, or CPUs), such as a processor 504. This processor may be a graphics processor in an embodiment of the invention. Processor 504 is connected to a communication infrastructure or bus 506. Computer system 500 also includes a main or primary memory 508, such as random access memory (RAM). Primary memory 508 has stored therein control logic (computer software), and data.

Computer system 500 also includes one or more secondary memory storage devices 510. Secondary storage devices 510 include, for example, a hard disk drive 512 and/or a removable storage device or drive 514. Removable storage drive 514 represents, for example, a magnetic tape drive, a compact disk drive, an optical storage device drive, etc.

Removable storage drive 514 interacts with a removable storage unit 518. Removable storage unit 518 includes a computer useable or readable storage medium having stored therein computer software (control logic) and/or data. The logic of the invention as illustrated in various flowcharts above, for example, may be embodied as control logic. Removable storage unit 518 represents, for example, a floppy disk, a magnetic tape, compact disk, DVD, optical storage disk, or any other computer data storage device. Removable storage drive 514 reads from and/or writes to removable storage unit 518 in a well known manner.

Computer system 500 may also include input/output/display devices 530, such as monitors, keyboards, pointing devices, etc.

Computer system 500 further includes a communication or network interface 527. Network interface 527 enables computer system 500 to communicate with remote devices. For example, network interface 527 allows computer system 500 to communicate over communication networks or mediums 526 (representing a form of a computer useable or readable medium), such as LANs, WANs, the Internet, etc. Network interface 527 may interface with remote sites or networks via wired or wireless connections.

Control logic may be transmitted to and from computer system 500 via communication medium 526. More particularly, computer system 500 may receive and transmit carrier waves (electromagnetic signals) modulated with control logic via communication medium 526.

Any apparatus or manufacture comprising a computer useable or readable medium having control logic (software) stored therein is referred to herein as a computer program product or program storage device. This includes, but is not limited to, computer system 500, main memory 508, hard disk 512, and removable storage unit 518. Carrier waves can also be modulated with control logic. Such computer program products, having control logic stored therein that, when executed by one or more data processing devices, can cause such data processing devices to operate as described herein, represent embodiments of the invention.

5.0 Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for tracking movement of employees and/or inventory, comprising:
    an RFID (Radio Frequency Identification) reader including:
        a power control module configured to modify the output power of the RFID reader for each read cycle in a set of read cycle;
        reader circuitry configured to perform the set of read cycle according to the output power levels determined by the power control module; and
        a location/orientation module coupled to the power control module and the reader circuitry, the location/orientation module configured to compare data obtained by the reader circuitry during each read cycle and the associated power level of the read cycle to determine location and orientation information for an RFID enabled device.

2. The system of claim 1, further comprising:
    a database configured to store an output power level for each performed read cycle and the data obtained by the reader circuitry during each read cycle.

3. The system of claim 2, wherein the location/orientation module is further configured to compare historical data stored in the database for the RFID enabled device to develop a view of movement of the RFID enabled device.

4. The system of claim 2, wherein the database is coupled to the location/orientation module.

5. The system of claim 1, wherein the location/orientation module is external to the RFID reader.

6. A method for tracking movement of employees and/or inventory using an RFID (Radio Frequency Identification) reader, comprising:
    performing a series of read cycles including:
        setting an output power level of the RFID reader to a predetermined value for the read cycle being performed,
        performing a read of a tag population;
    for each read cycle, storing the output power used during the read cycle and tag identification data obtained during the read cycle;
    comparing the data for each read cycle to determine the location and orientation of an RFID device.

7. The method of claim 6, wherein setting an output level of the RFID reader includes:
    setting the output level of the RFID reader to a predetermined value based on a location/orientation tracking algorithm.

8. The method of claim 6, wherein storing the output power further comprises:
    storing a time stamp associated with the read cycle.

9. The method of claim 8, further comprising:
    comparing historical data for the RFID reader over a pre-defined time period to develop a view of movement of the RFID device during the time period.

10. A computer program product for tracking movement of employees and/or inventory using an RFID (Radio Frequency Identification) reader comprising a computer useable medium having a computer program logic recorded thereon for controlling at least one processor, the computer program logic comprising:
    computer program code means for performing a series of read cycles including:
        code for setting an output power level of the RFID reader to a predetermined value for the read cycle being performed,
        code for performing a read of a tag population;
        code for storing the output power used during the read cycle and tag identification data obtained during the read cycle, for each read cycle;
        code for comparing the data for each read cycle to determine the location and orientation of an RFID device.

11. The computer program product of claim 10, wherein said code for setting an output level of the RFID reader includes:
    code for setting the output level of the RFID reader to a predetermined value based on a location/orientation tracking algorithm.

12. The computer program product of claim 10, wherein said code for storing the output power further comprises:
    code for storing a time stamp associated with the read cycle.

13. The computer program product of claim 12, comprising:
    code for comparing historical data for the RFID reader over a pre-defined time period to develop a view of movement of the RFID device during the time period.

14. The system of claim 1, wherein the location/orientation module is configured to consider a type of antenna associated with the RFID reader and a resulting antenna pattern in determining the location and orientation information.

15. The system of claim 5, further comprising:
    one or more additional RFID readers communicatively coupled to the location/orientation module, wherein the location/orientation module is configured to correlate data from the RFID reader and the one or more additional RFID readers for determining the location and orientation information.

16. The method of claim 6, further comprising:
    considering a type of antenna associated with the RFID reader and a resulting antenna pattern in determining the location and orientation information.

17. The computer program product of claim 12, wherein the computer program logic further comprising:
    code for considering a type of antenna associated with the RFID reader and a resulting antenna pattern in determining the location and orientation information.

* * * * *